United States Patent
Sanderovich et al.

(10) Patent No.: US 8,705,661 B2
(45) Date of Patent: Apr. 22, 2014

(54) TECHNIQUES FOR CHANNEL ESTIMATION IN MILLIMETER WAVE COMMUNICATION SYSTEMS

(75) Inventors: Amichai Sanderovich, Haifa (IL); Ohad Rozen, Tel-Aviv (IL)

(73) Assignee: Wilocity, Ltd., Caesarea (IL)

( * ) Notice: Subject to any disclaimer, the term of this patent is extended or adjusted under 35 U.S.C. 154(b) by 38 days.

(21) Appl. No.: 13/408,625

(22) Filed: Feb. 29, 2012

(65) Prior Publication Data

US 2013/0223498 A1 Aug. 29, 2013

(51) Int. Cl.
*H03K 9/00* (2006.01)

(52) U.S. Cl.
USPC ........... 375/316; 375/142; 375/150; 375/343; 708/5; 708/422; 708/813; 714/783

(58) Field of Classification Search
None
See application file for complete search history.

(56) References Cited

U.S. PATENT DOCUMENTS

| | | | |
|---|---|---|---|
| 7,522,655 B2 * | 4/2009 | Ruprich et al. | 375/150 |
| 2007/0168841 A1 * | 7/2007 | Lakkis | 714/781 |
| 2008/0298435 A1 | 12/2008 | Lakkis | |
| 2009/0097533 A1 | 4/2009 | Lakkis | |
| 2009/0100316 A1 | 4/2009 | Lakkis | |
| 2009/0125792 A1 | 5/2009 | Lakkis | |
| 2009/0163143 A1 | 6/2009 | De Rore | |
| 2009/0204874 A9 | 8/2009 | Lakkis | |
| 2010/0272158 A1 | 10/2010 | Lakkis | |
| 2013/0083865 A1 * | 4/2013 | Wu et al. | 375/267 |

* cited by examiner

*Primary Examiner* — Adolf Dsouza
(74) *Attorney, Agent, or Firm* — Myers Wolin, LLC

(57) ABSTRACT

A method for performing channel estimation in a millimeter wave wireless communication system. The method includes receiving complementary sequences at a receiver of the millimeter wave wireless communication system. The received complementary sequences are generated at a first sampling rate; producing special complementary sequences from the received complementary sequences; cross-correlating the special complementary sequences with an input signal related to the received complementary sequences. The cross-correlation is performed at a second sampling rate and the second sampling rate is higher than the first sampling rate; and analyzing the result of the cross-correlation to estimate at least characteristics of a channel between the receiver and a transmitter of the millimeter wave wireless communication system.

17 Claims, 7 Drawing Sheets

US 8,705,661 B2

TECHNIQUES FOR CHANNEL ESTIMATION IN MILLIMETER WAVE COMMUNICATION SYSTEMS

TECHNICAL FIELD

The invention generally relates to techniques for channel estimation in a wireless communication system, and more particularly for techniques for channel estimation using Golay complementary sequences.

BACKGROUND

In wireless transmission systems, signals circulate between transmitters and receivers through channels. Due to many factors in the channel characteristics, a distortion is induced in the signal transmitted by a transmitter. Therefore, it is generally necessary to determine the characteristics of the channel, at a given moment, in order to estimate the induced distortion of the transmitted signal.

There are a number of techniques for performing channel estimation in wireless transmission systems. One such technique includes transmitting by a transmitter signals with predetermined sequences and comparing the signals received in a receiver using auto-correlation and cross-correlation with the expected signals in order to estimate the characteristics of the channel. The sequences of the transmitted signals are known to the receiver. The results of the correlation operation constitute the estimation of the impulse response of the channel.

For efficient channel estimation, sequences with good autocorrelation properties, such as complementary sequences, e.g., Golay complementary sequences, are transmitted by the transmitter and auto-correlated by the receiver. The property of Golay complementary sequences is their perfect sum of autocorrelations. Another property of the Golay complementary sequences is that the corresponding correlator has a very efficient implementation, which requires only $\log_2(N)$ additions for two complementary sequences of length N. By comparison, other sequences require N additions to implement such a correlator.

As shown in FIG. 1, in a transmitter 100, a Golay generator 101 generates Golay complementary sequences (Gu, Gv) which are later modulated and transmitted using a modulator 102. The modulator 102 may be, for example, an OFDM modulator, a single carrier modulator, and the like. The Golay generator 101 generates the complementary sequences at sampling rate Ft.

The signals S' including the sequences G'u,G'v are received at a receiver 110 which operates at a sampling rate Fs which is higher than the rate Ft. It should be noted that due to the channel conditions, the received sequences Gu', Gv' may be different than the original sequences Gu, Gv. The received signals S' are sampled at a rate Fs. However, a Golay correlator 111 should correlate the received sequences at a rate Ft. With this aim, the signals S' (including sequences G'u,G'v) are filtered using a filter 112, which may be a polyphase filter, to change their sampling rate to a rate Ft of the Golay correlator 111. Then, the cross-correlation results which indicate the channel estimation (CE) as provided by the Golay correlator 111 are up-sampled to a rate Fs by a filter 113. Then, an equalizer (EQ) 114 equalizes the received signals S' based on the output of the Golay correlator 111. The equalized signals are de-modulated using a demodulator 115. The equalizer 114 and demodulator 115 operate at a sampling rate of Fs.

In millimeter wave wireless transmission systems, the rate Ft utilized by the transmitter and Golay correlator 111 is different from the sampling rate Fs of the receiver. For example, in a millimeter w.ave communication system operable in the 60 GHz band and defined, for example, in the IEEE 802.11 ad standard, the Golay sequence generator rate (Ft=1.76 GHz) is 1.5 times the sampling rate of the receiver (Fs=2.64 GHz), i.e., Fs=Ft*1.5. The oversampling is performed in OFDM and non-OFDM modulated signals in order to avoid sensitivity to timing errors or shaping filters of the transmitter.

As mentioned above one technique for channel estimation at different rates includes down-sampling the received signals to the correlator rate Ft from the rate Fs using a polyphase filter (e.g., a filter 112), applying the Golay correlator, and then up-sampling the correlator's output back to the rate Fs from the rate Ft.

Other techniques include re-sampling the received Golay sequences to the rate Fs, then using a single re-sampled Golay correlator in the rate Fs. However, such a re-sampled Golay correlator does not lend itself to a $\log_2(N)$ type of implementation as additional N add operators and multiplication operators are required.

In addition to the obvious disadvantages of the prior art solutions in terms of complexity, such solutions induce additional noise and distortions due to the non-perfect re-sampling, which usually involves a finite re-sampling filter.

It would be therefore advantageous to provide a solution that would limit the drawbacks of existing solutions for performing channel estimation using Golay correlators, when different sampling rates are implemented in the wireless transmission systems.

SUMMARY

Certain embodiments disclosed herein include a method for a method for performing channel estimation in a millimeter wave wireless communication system. The method comprises receiving complementary sequences at a receiver of the millimeter wave wireless communication system, wherein the received complementary sequences are generated at a first sampling rate; producing special complementary sequences from the received complementary sequences; cross-correlating the special complementary sequences with an input signal related to the received complementary sequences, wherein the cross-correlation is performed at a second sampling rate and the second sampling rate is higher than the first sampling rate; and analyzing the result of the cross-correlation to estimate at least characteristics of a channel between the receiver and a transmitter of the millimeter wave wireless communication system.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

Figure 1:
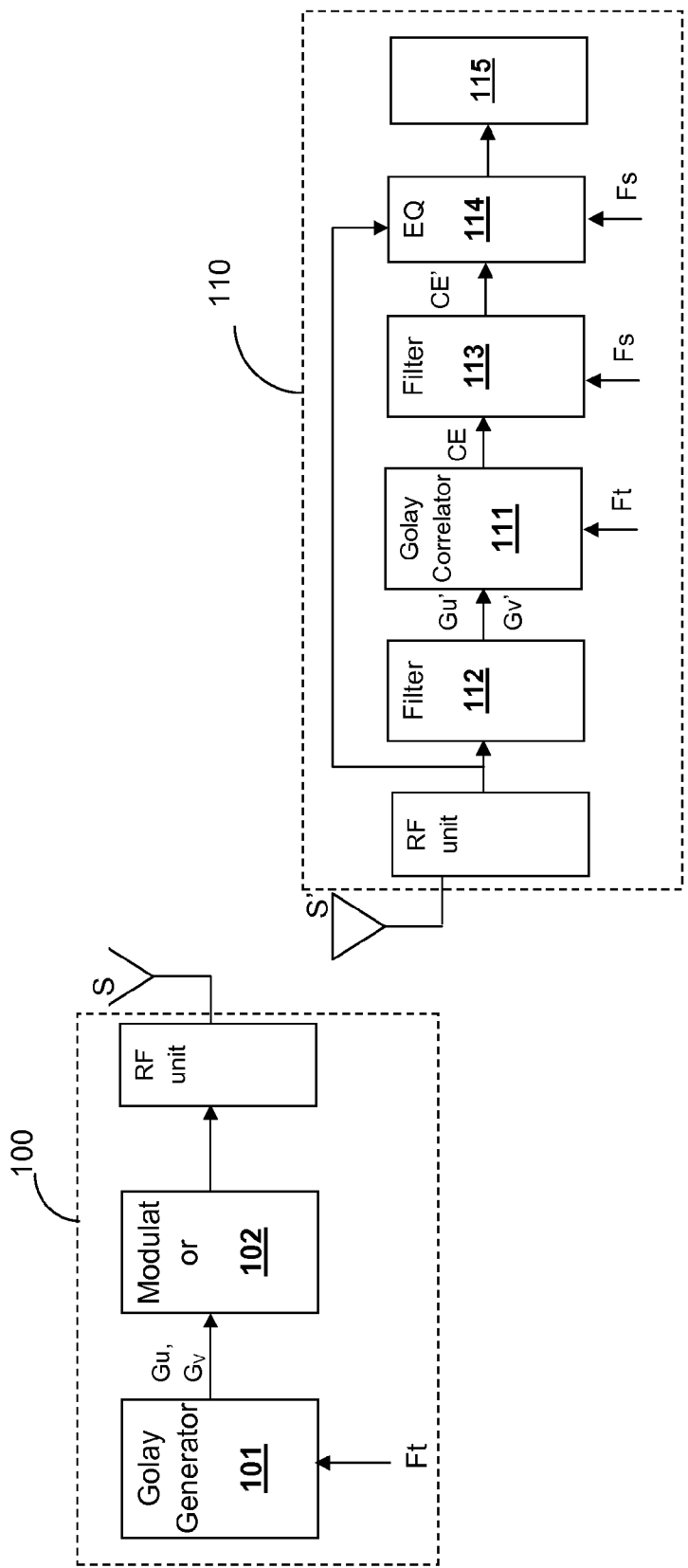
FIG. 1 is a block diagram of a wireless communication system.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented in wireless systems employing millimeter-wave transmission in the 60 GHz band, such as defined by the IEEE 802.11.ad protocol. However, the disclosed embodiments can be utilized in wireless systems employing other types of protocol.

Figure 2:
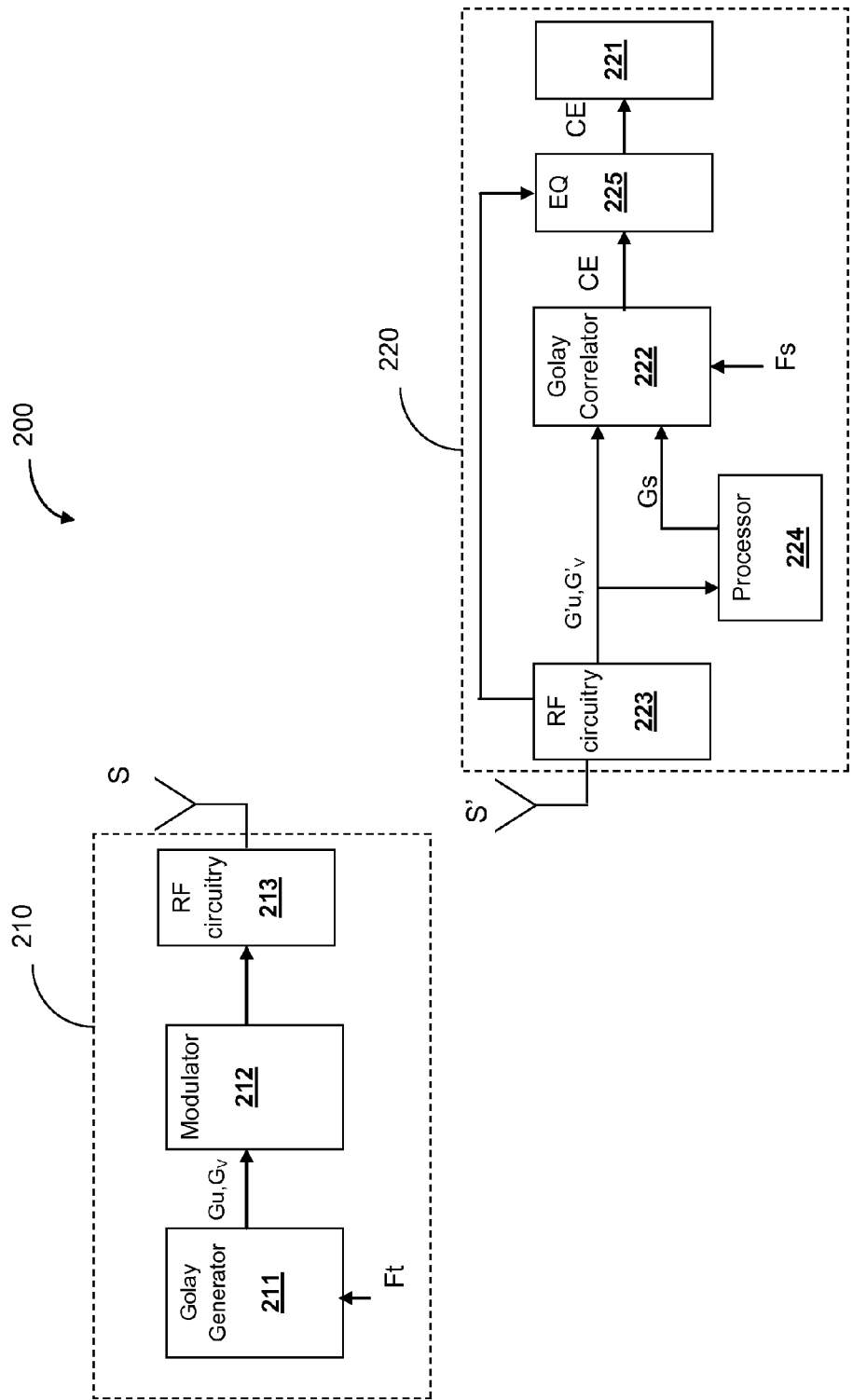
FIG. 2 is a block diagram of a wireless communication system utilized to describe various embodiments of the invention.

FIG. 2 shows an exemplary block diagram of a wireless communication system 200 utilized to describe one embodiment of the invention. The system 200 includes a transmitter 210 and a receiver 220. The transmitter 210 includes a Golay generator 211 that generates Golay complementary sequences Gu, Gv being provided as an input to a signal modulator 212. The transmitter 210 and receiver 220 also include a radio frequency (RF) circuitry 213 and 223 for respectively transmitting and receiving millimeter wave signals over a 60 GHz frequency band. The modulated signals including the sequences Gu are transmitted over a wireless medium to the receiver 220.

As mentioned above the Golay complementary sequences are utilized, in part, to perform channel estimation. With this aim, in the communication systems defined for example in the IEEE 802.11.ad protocol, the signals S are in a form of data packets. The data packets include a preamble portion that includes at least a channel estimation field. The channel estimation field includes at least the Golay complementary sequences Gu, Gv. The channel estimation field may comprise a concatenation of two different complementary Golay sequences, each of which includes sequences of values (elements) determined by a delay vector D and a weight vector W. The vectors D and W each have K values. The number of elements (samples) N of the Golay sequence is $2^K$.

As an example, Golay complementary sequences Gu and Gv having 128 values (elements) each may be generated by the following delay (D) and weight (W) vectors: D=[D1, ..., D7]=[1, 8, 2, 4, 16, 32, 64] and W=[$W_1$, ..., $W_7$]=[−1, −1, −1, −1, +1, −1, −1]; (k=1,2, ..., 7), and N=128. The values of the delay vector D are delay blocks representing the number of samples that should be obtained from the memory. As an example, for a delay value $D_7$=64, the number of samples that should be obtained is 64. Both sequences Gu and Gv are generated by a Golay generator that may utilize the above delay and weight vectors. The sequences Gu and Gv are complementary to each other.

The receiver 220 receives the signals S' which include the sequences (Gu, Gv) transmitted by the transmitter. A Golay correlator 222 at the receiver 220 cross-correlates an input related to the received complementary sequences (Gu, Gv) with special Golay complementary sequences (Gs) produced according to various embodiments of the invention discussed in detail below. The special sequences Gs are complementary sequences that are derived from the delay and weight vectors of the original sequences Gu, Gv and structured to perform the cross-correlation at a sampling rate of Fs without using the polyphase filter. It should be emphasized that the complementary sequences Gs are not the excepted complementary sequences that correspond to the sequences Gu, Gv. As will be demonstrated below, the Golay correlator 222, implemented according to certain embodiments of the invention, includes $\log_2(N)$ operations, where N is the length of the Golay complementary sequences.

The channel estimation output by the Golay correlator 222 is provided to an equalizer (EQ) 225 that equalizes the received signals S' based on the correlator's 222 output input. Then, the equalized signals are de-modulated using the de-modulator 221. The modulator 212 and de-modulator 221 modulates/de-modulates the signals using any one of an OFDM and a single carrier modulation technique.

The Golay generator 211 and signal modulator 212 operate at a sampling rate Ft. The Golay correlator 222, thus the channel estimation is operable at a sampling rate Fs, where Ft is a lower sampling rate than the Fs. As can be understood, the receiver 220 and particularly the Golay correlator 222 does not require re-sampling of the complementary sequences G'u, G'v and the output of the correlator as performed by conventional solutions. As a result, the proposed solution eliminates any signal distortions induced by the sampling filters.

The special Golay complementary sequences Gs are produced based on the ratio between the sampling rates Ft and Fs. According to one embodiment, when the ratio between the rates Fs and Ft is a power of two, i.e., Fs=Ft*$2^m$, where m is an integer number equals to or greater than 1, the Golay complementary sequences Gs are a subset of the original sequences Gu, Gv. That is, if the Golay complementary sequences Gu, Gv are:

Gu={$Xu_1$, $Xu_2$, $Xu_3$, ... $Xu_N$}, and

Gv={$Xv_1$, $Xv_2$, $Xv_3$, ... $Xv_N$}, then, two decimated special Golay complementary sequences Gu-s Gv-s are generated, each of which includes $N/2^m$ samples (elements) of the sequences Gu and Gv.

Figure 3:
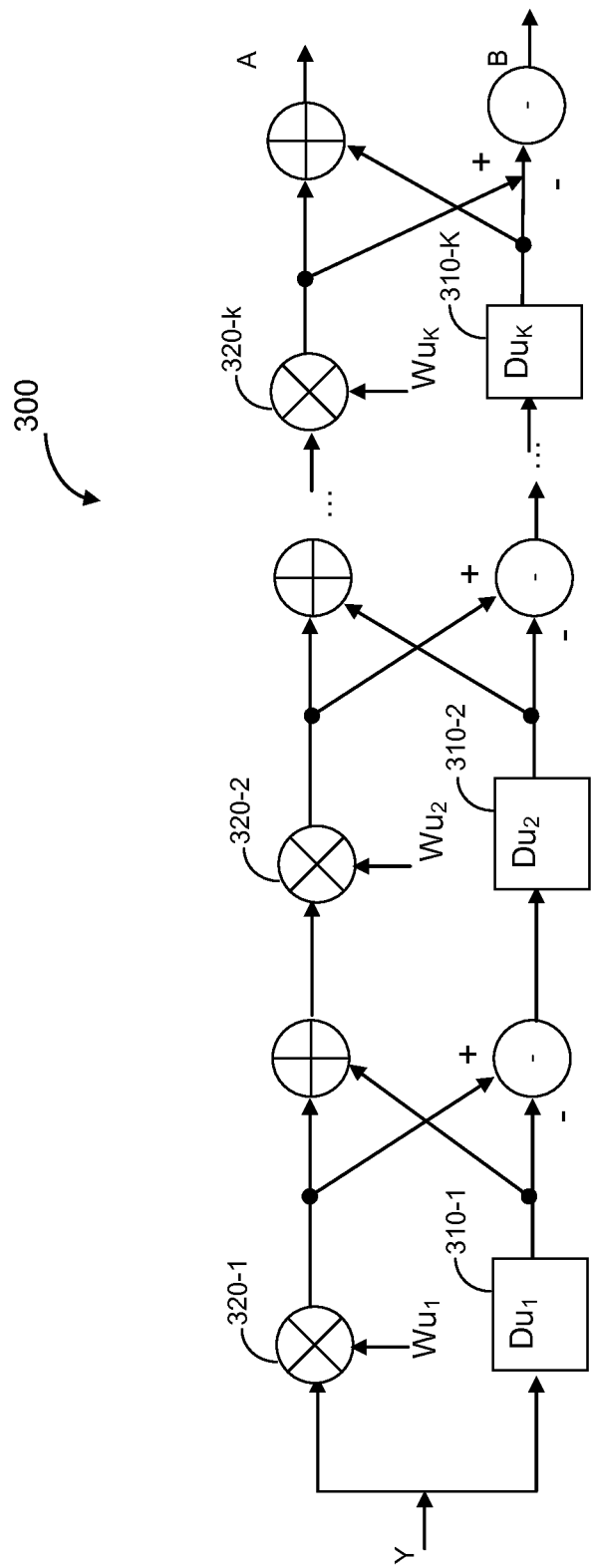
FIG. 3 is a schematic diagram of a Golay correlator that corresponds to Golay sequences transmitted by a transmitter.

FIG. 3 shows a schematic diagram of a Golay correlator 300 respective of the received Golay sequences Gu, Gv being generated using a delay vector Du=[$Du_1$, $Du_2$, ..., $Du_K$] and a weight vector Wu=[$Wu_1$, $Wu_2$, ..., $Wu_K$]; K=$\log_2(N)$, and N is the length of one of the sequences Gu,Gv. Delay blocks 310-1, 310-2, ..., 310-K respectively correspond to delay values $Du_1$, $Du_2$, ..., $Du_K$ in the delay vector Du. As mentioned above, each delay value (realized by a delay block) means that a number of Du, (i=0, ..., K) samples should be obtained from a memory utilizes to store the samples.

Each of the multipliers 320-1, 320-2, ..., 320-K multiplies its input sample by a respective weight value $Wu_1$, $Wu_2$, ..., $Wu_K$ from the vector weight Wu. Each weight value $Wu_i$ (i=0, ..., K) may be either +1 or −1. The outputs A and B of the correlator 300 correspond to the cross-correlation functions of an input Y with the sequences Gu and Gv respectively.

Figure 4:
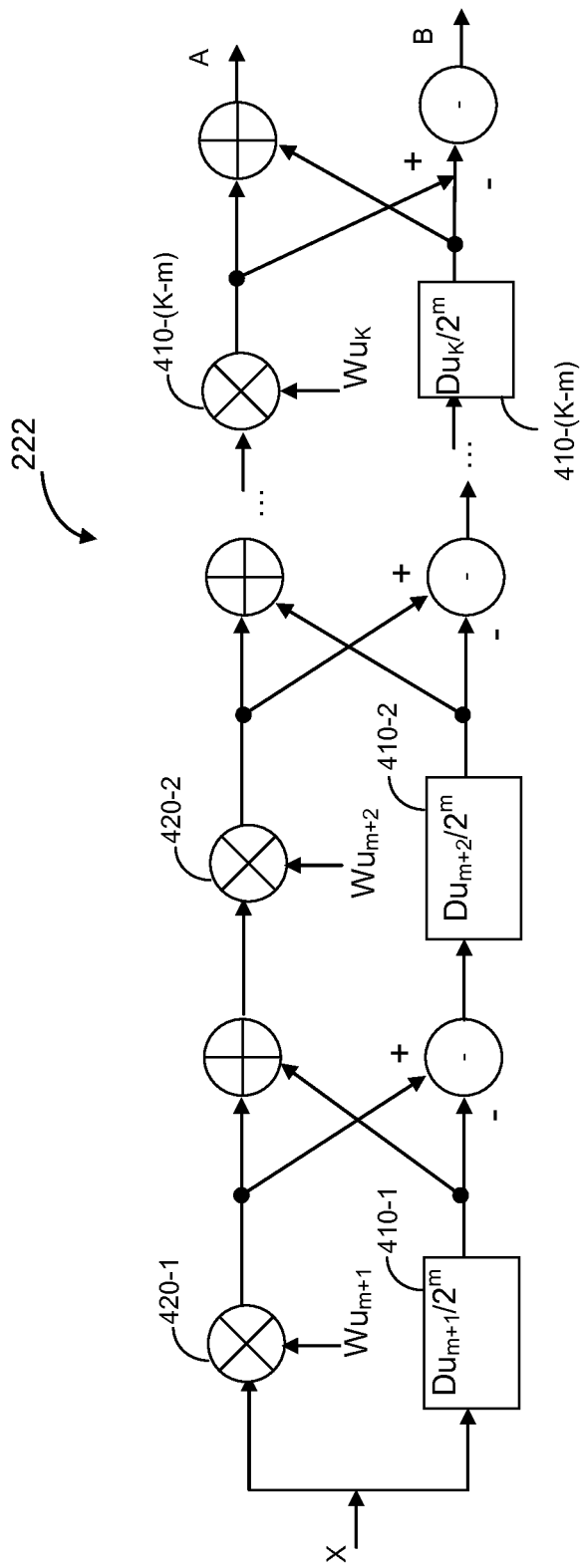
FIG. 4 is a schematic diagram of a Golay correlator constructed in accordance with one embodiment of the invention.

FIG. 4 shows a schematic diagram of an implementation of the Golay correlator 222 according to an embodiment of the invention. Here, the Golay correlator 222 corresponds to the special Golay sequences Gu-s, Gu-v being derived from the original sequences Gu, Gv discussed with reference to FIG. 3.

Specifically, the Golay correlator 222 in this embodiment includes the last K-m delay blocks 410-1, 410-2, ..., 410-K-m that respectively correspond to delay values in the delay vector Du, i.e., the values $Du_{m+1}$, $Du_{m+2}$, ..., $Du_K$, where delay values of the vector Du having value less than the integer number $2^m$ are located in indexes that are equal to or less than the number m.

For example, if the delay vector Du=[Du1, Du2, Du3, Du4, Du5, Du6, Du7] is [1, 8, 2, 4, 16, 32, 64] and m=1, then the correlator 222 is based on the delay vector Ds is [Du2, Du3, Du4, Du5, Du6, Du7]=[8, 2, 4, 16, 32, 64], i.e., the delay vector Ds does not include the delay value Du1. In addition, each delay block 410 implements only $2^m$ (2 power of m) of the delay value of its respective value in the $Du_i$ (i=m+1, m+2, ..., K). That is, a respective delay block 410 waits until a number of $Du_i/2^m$ (i=m+1, ..., K) samples are obtained from the memory (not shown). Referring back to the above example, in this case the delay vector Ds is [8/2, 2/2, 4/2, 16/2, 32/2, 64/2], where m=1.

Each of multipliers 420-1, 420-2, ..., 420-(K-m) multiplies an input sample by its respective weight value $Wu_{m+1}, \ldots, Wu_K$ from the vector Wu, where K is the number of elements in the vector Wu. That is, a weight vector Ws utilized in the correlator 220 includes the last K-m weight values from the vector Wu.

For example, if Wu=[−1, −1, −1, −1, +1, −1, −1], and m=1, then Ws does not include the first weight value, i.e., Ws=[−1, −1, −1, +1, −1, −1]. Each weight $Ws_i$ (i=m+1, ..., K) can be either +1 or −1. The outputs A' and B' of the Golay correlator 222 of FIG. 4 correspond to the cross-correlation functions of an input X with the special sequences Gu-s and Gv-s respectively. The input X may include a version of the original sequences Gu,Gv that may be sampled at a different rate than the transmission rate. It should be noted that the vectors Ds and Ws are utilized in the Golay correlator 400 as the original sequences Gu and Gv use the same delay and weight vectors (referred to as Du and Wu).

In a different notation, the special Golay sequences Gu-s and Gv-s are based on the delay vector Ds=[$Du_{m+1}/2^m$, $Du_{m+2}/2^m$, ..., $Du_K/2^m$] and a weight vector Ws=[$Wu_{m+1}, \ldots, Wu_K$], where $Du_{m+1}, Du_{m+2}, \ldots, Du_K$ and $Wu_{m+1}, \ldots, Wu_K$, are values from the delay (Du) and weight (Wu) vectors of the received Golay sequences Gu, Gv, where the delay values of the vector Du having value less than the integer number $2^m$ are located in indexes that are equal to or less than the number m.

In accordance with another embodiment, different special Golay complementary sequences (Gs) are generated for the case where the rate Fs is 1.5 times higher from the rate Ft (e.g., Ft=1.76 GHz and Fs=2.64 GHz), as defined, for example, in the IEEE 802.11ad protocol. Specifically, based on the original sequences Gu,Gv, four special Golay complementary sequences (Gus-odd, Gus-even, Gvs-odd and Gvs-even) are produced. These sequences are formed by taking odd and even samples of the received signals. For example, if the original sequences Gu is:

Gu={$Xu_1, Xu_2, Xu_3, \ldots Xu_N$}, then, the Gus-odd and Gus-even are the following decimated Golay sequences:

Gus-even={$Xu_2, Xu_4, Xu_6, \ldots Xu_N$}

Gus-odd={$Xu_1, Xu_3, Xu_5, Xu_7, \ldots Xu_{N-1}$} where N is the length of the sequence Gu (assuming N is an even number). In a similar manner the sequences Gvs-odd and Gvs-even are produced.

Figure 5:
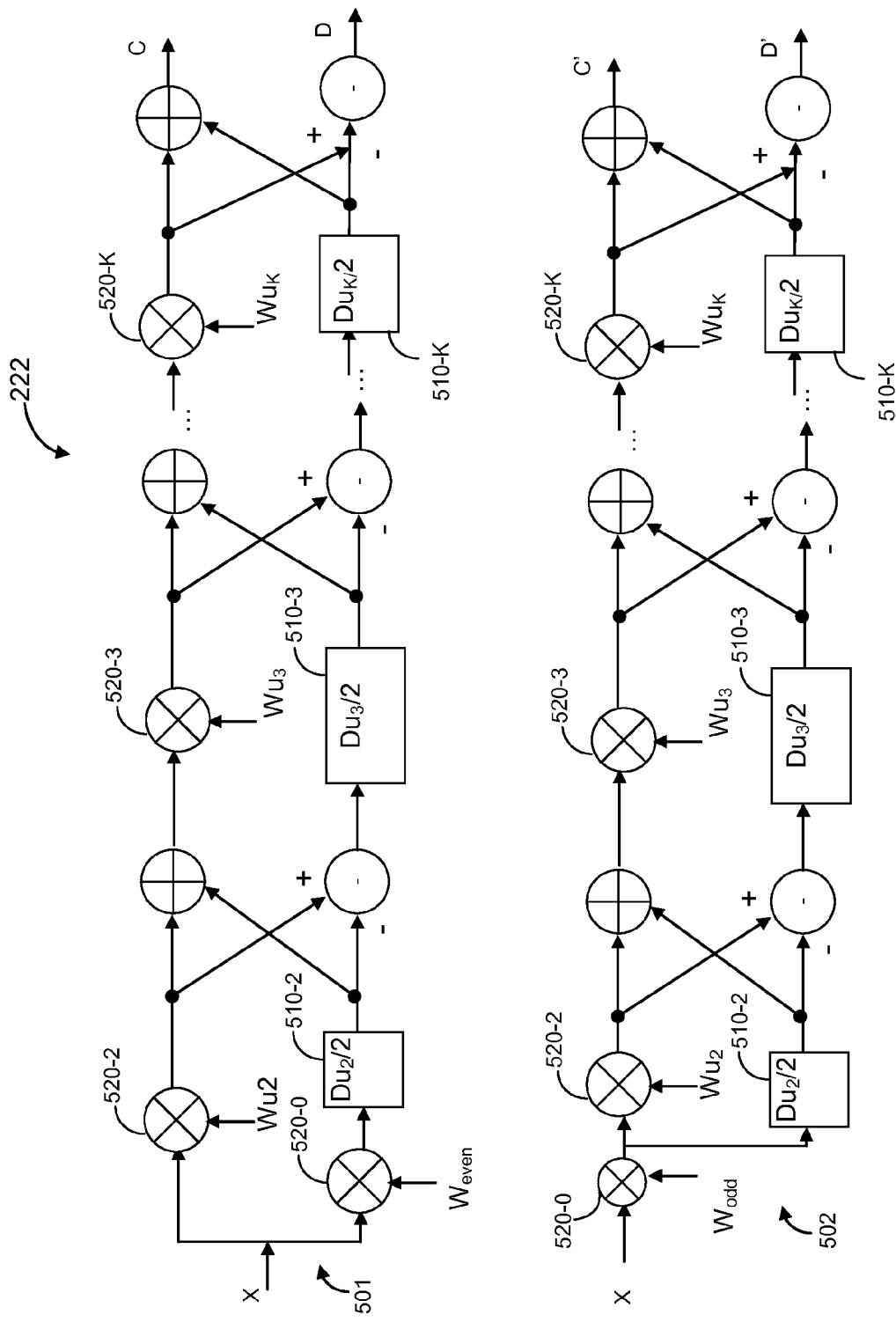
FIG. 5 is a schematic diagram of a Golay correlator constructed in accordance with another embodiment of the invention.

Reference is now made to FIG. 5 where a schematic diagram of an implementation of the Golay correlator 222 according to another embodiment is shown. The sequences Gus-even and Gvs-even are complementary sequences, thus can be cross-correlated using a single Golay correlator 501. The sequences Gus-odd and Gvs-odd are also complementary sequences, thus can be cross-correlated using a single Golay correlator 502. The correlators 501 and 502 are realized as the Golay correlator 222 illustrated in FIG. 5. The sampling rate of the Golay correlator 222 is Fs and its complexity is $\log_2(N)$.

In this embodiment, the correlator 501 includes K−1 delay blocks 510-2, 510-3, ..., 510-K that respectively correspond to K−1 last delay values in the delay vector Du, i.e., the values $Du_2, Du_3, \ldots, Du_K$. In addition, each delay block 510-2, 510-3, ..., 510-K implements only half of the delay value of its respective value $Du_r$ (r=2, 3, ..., K). That is, a respective delay block 510-r waits until a number of $Du_r/2$ samples are obtained.

A number of K multipliers 520-0, 520-2, 520-3, ..., 520-K are also included in the correlator 501. Each of the multipliers 520-2, 520-3, ..., 520-K multiplies an input by a respective weight value $Wu_2, Wu_3, \ldots, Wu_K$ from the vector Wu of the sequences Gu, Gv. Each weight value $Wu_2, Wu_3, \ldots, Wu_K$ may be either +1 or −1. The additional multiplier 520-0 is connected to the delay block 510-2 and multiplies an input X with a weight value Weven. In an exemplary embodiment, the weight value Weven equals to −1. The outputs C and D of the correlator 501 correspond to the cross-correlation functions of an input X with the sequences Gus-even and Gvs-even respectively. The input X may include a version of the original sequences Gu,Gv that may be sampled at a different rate than the transmission rate.

The odd correlator 502 also includes K−1 delay blocks 510-2, 510-3, ..., 510-K that respectively correspond to K−1 last delay values in the delay vector Du, i.e., the values $Du_2, Du_3, \ldots, Du_K$. In addition, each delay block 510-2, 510-3, ..., 510-K implements only half of the delay value of its respective value $Du_r$ (r=2, 3, ..., K). A number of K−1 multipliers 520-2, 520-3, ..., 520-K are also included in the correlator 502. Each of the multipliers, 520-2, 520-3, ..., 520-K multiplies an input by a respective weight value $Wu_2, Wu_3, \ldots, Wu_K$ from the vector Wu of the sequences Gu, Gv. Each weight value $Wu_1, Wu_2, Wu_3, \ldots, Wu_K$ may be either +1 or −1.

According to this embodiment, an additional multiplier 520-0 is connected to the input X of the correlator 502. The multiplier 520-1 applies a Wodd value on the input X. In exemplary embodiment, Wodd is equal to $Wu_1$. The output of the multiplier 520-1 is provided to the multiplier 520-2 and delay block 510-2. The outputs C' and D' of the correlator 502 correspond to the cross-correlation functions of the input X with the special sequences Gus-odd and Gvs-odd respectively. The input X may include a version of the original sequences Gu,Gv that may be sampled at a different rate than the transmission rate.

In a different notation, the special Golay sequences Gus-even, Gvs-even are based on the delay vector Ds-even=[$Du_2/2, Du_3/2, \ldots, Du_K/2$] and a weight vector Ws-even=[$Wu_2, Wu_3, \ldots, Wu_K$], where $Du_2, Du_3, \ldots, Du_K$ and $Wu_2, W_3, \ldots, Wu_K$, are values of the delay (Du) and weight (Wu) vectors of the received Golay sequences Gu, Gv.

The special Golay sequences Gus-odd and Guv-odd are based on the delay vector Ds-odd=[$Du_2/2, Du_3/2, \ldots, Du_K/2$] and a weight vector Ws=[$Wu_2, \ldots, Wu_K$], where $Du_2$, $Du_3, \ldots, Du_K$ and $Wu_1, Wu_2, W_3 \ldots, Wu_K$, are values of the delay (Du) and weight (Wu) vectors of the original Golay sequences Gu, Gv.

Figure 6:
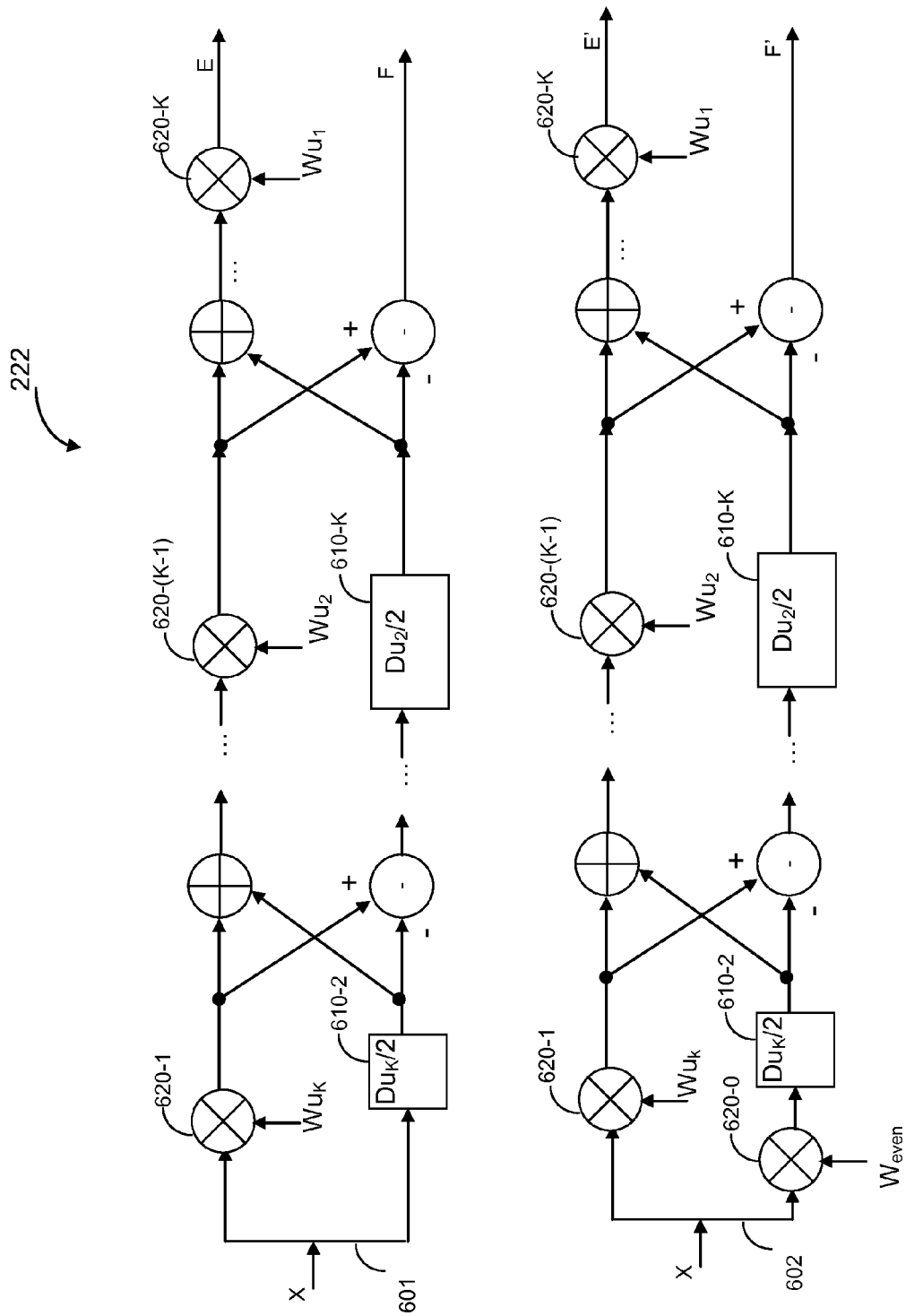
FIG. 6 is a schematic diagram of a Golay correlator constructed in accordance with another embodiment of the invention.

FIG. 6 shows another implementation of the Golay correlator 222 according to an embodiment. Here, the Golay correlate includes two correlators 601 and 602 utilized to cross-correlate even and odd samples of the Gu, Gv sequences defined above.

The correlator 601 allows correlating an input X with Gus_even and Gus_odd simultaneously. The correlator 601 is based on reversing the values of the delay and weight vectors. The correlator 601 includes K−1 delay blocks 610-2, 610-3, . . . , 610-K that respectively correspond to K−1 last delay values, in their revered order in the delay vector Du, i.e., the values $Du_k, Du_{k-1}, \ldots, Du_2$. In addition, each delay block 610-2, 610-3, . . . ,610-K implements only half of the delay value of its respective delay value as defined in the vector Du.

A number of K multipliers 620-1, . . . , 620-K−1, 620-K are also included in the correlator 602. Each of the multipliers 620-1, . . . , 620-K−1, 620-K multiplies an input by a respective weight value $Wu_K, \ldots, Wu_2, Wu_1$ from the weight vector Wu of the sequences Gu, Gv. Each weight value $Wu_2, Wu_3, \ldots, Wu_K$ may be either +1 or −1. The outputs E and F of the correlator 601 correspond to the cross-correlation functions of an input X with the sequences Gus-odd and Gus-even respectively. The input X may include a version of the original sequences Gu,Gv that may be sampled at a different rate than the transmission rate.

In a different notation, the delay vector of the correlator 601 is $[D_{uK}/2, D_{uK-1}/2, \ldots, D_{u2}/2]$. The weight vector of the correlator 601 is $[W_{uK}, W_{uK-1}, \ldots, W_{u2}]$, where the values in these vectors are values of the delay (Du) and weight (Wu) vectors of the received Golay sequences Gu, Gv. In exemplary embodiment the weights utilized by the multipliers 620-K is $Wu_1$.

The correlator 602 has a similar structure to the correlator 601. The only difference is that an additional multiplier 620-0 multiplies an input X with a weight value Weven. This value, in one embodiment, is equal to −1, this serves as a NOT logic gate. The outputs E' and F' of the correlator 602 correspond to the cross-correlation functions of an input X with the sequences Gvs-odd and Gvs-even respectively. The input X may include a version of the original sequences Gu,Gv that may be sampled at a different rate than the transmission rate.

In one embodiment, the various special Golay complementary sequences are produced by a processing unit 224 included in the receiver 220. According to this embodiment, the processing unit 224 is programmed to sample the received Gu, Gv sequences to generate the special Golay complementary sequences based on the ratio between the Fs and Ft as described above.

Specifically, the processor 224 produces even and odd samples from the received sequences G'u, G'v in order to generate the input signal to be processed in the correlator. In another embodiment, the processor 224 takes only $N/2^m$ samples to generate such an input single (when $Fs=R*2^m$).

Figure 7:
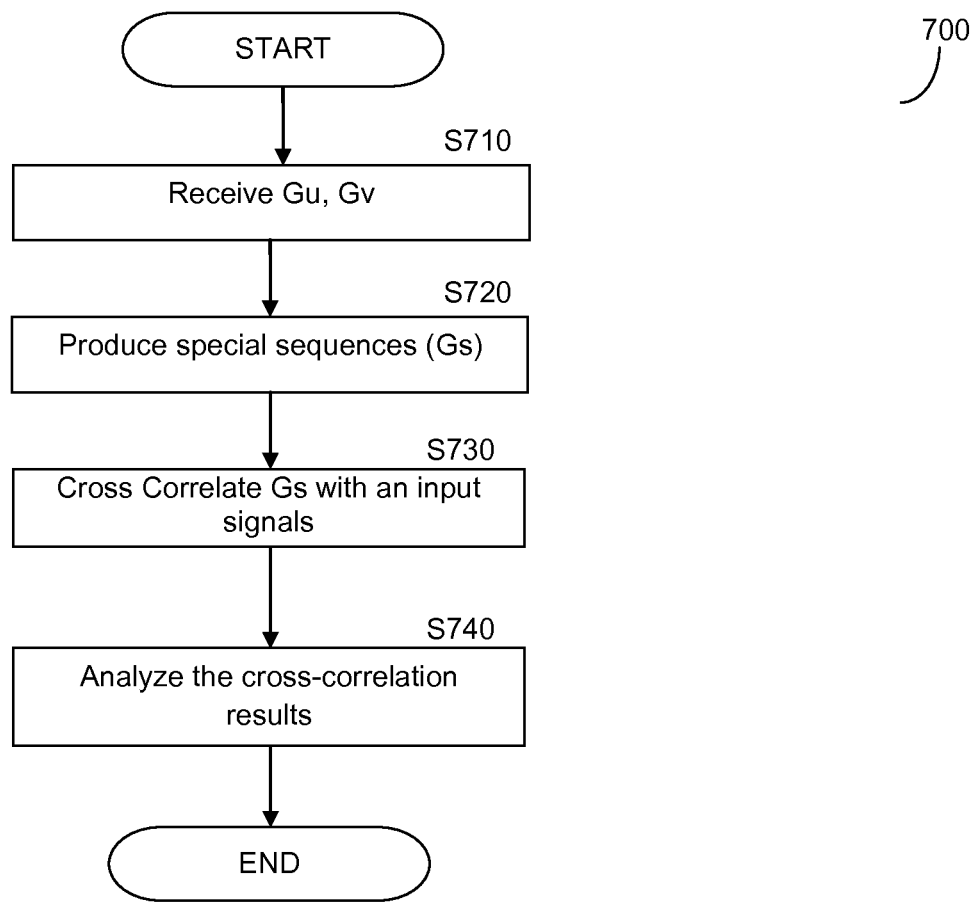
FIG. 7 is a flowchart illustrating a channel estimation implemented according to an embodiment of the invention.

FIG. 7 shows a non-limiting and exemplary flowchart 700 illustrating a method for performing the channel estimation using a Golay correlator according to an embodiment of the invention. The channel estimation is performed at a sampling rate Fs which is different from the sampling rate Ft used to generate Golay sequences utilized for the channel estimation. In one embodiment, the rate Fs is 1.5 times higher than the rate Ft. In another embodiment, the rate Fs is higher than the rate Ft by a power of two. According to certain embodiments, the method is implemented by a receiver operable in milli-meter-wave wireless communication systems utilizing, for example, the IEEE 802.11ad protocol.

At S710, Golay complementary sequences Gu, Gv generated by the transmitter are received at the receiver. As mentioned above, such sequences are encapsulated in a channel estimation field in a preamble of transmitted data packets. The Golay sequences Gu are generated at a sampling rate Ft.

At S720, special Golay complementary sequences are produced by sampling the received Gu,Gv sequences at the rate Fs. Different embodiments for producing the Golay complementary sequences based on the ratio between Fs and Ft may be utilized. In one embodiment, if the ratio between Fs and Ft is a power of two $2^m$ (m is an integer number), then $N/2^m$ samples of the Gu, Gv sequences are utilized to produce special Golay sequences Gs (N and m are defined above). In another embodiment, if the ratio between Fs and Ft is 3/2, then four complementary special Golay sequences respective of even odd samples of the received Gu, Gv complementary sequences are produced. The embodiments for producing the special Golay complementary sequences are described in detail above.

At S730, an input signal X is cross-correlated with the special Golay complementary sequences produced at S620 by means of a Golay correlator operable at a sampling rate Fs. The input signal X may include the sequences Gu, Gv or delta value of such sequences. Various possible implementations for a Golay correlator that can be utilized at S730 are described in detail above and further illustrated in FIGS. 4, 5 and 6. At S740, the results of the cross-correlation are analyzed to estimate the induced distortions in the transmitted signal and the characteristics of the channel.

The various embodiments of the invention can be implemented as hardware, firmware, software or any combination thereof. Moreover, the software is preferably implemented as an application program tangibly embodied on a program storage unit, computer readable medium, or machine readable medium. One of ordinary skill in the art would recognize that a "machine readable medium" is a medium capable of storing data and can be in a form of a digital circuit, an analogy circuit or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for performing channel estimation in a millimeter wave wireless communication system, comprising:
   receiving complementary sequences at a receiver of the millimeter wave wireless communication system, wherein the received complementary sequences are Golay complementary sequences generated at a first sampling rate;
   producing special complementary sequences from the received complementary sequences, wherein the special complementary sequences Golay complementary sequences;
   cross-correlating the special complementary sequences with an input signal related to the received complementary sequences, wherein the cross-correlation is performed at a second sampling rate and the second sampling rate is higher than the first sampling rate, wherein the cross-correlation is performed by a Golay correlator operating at the second sampling rate, wherein the Golay correlator includes log2(N) operation where N is a length of the received complementary sequences; and
   analyzing the result of the cross-correlation to estimate at least characteristics of a channel between the receiver and a transmitter of the millimeter wave wireless communication system.

2. The method of claim 1, wherein producing the special complementary sequences includes:
   using a number samples of the received complementary sequences equals to a length of the received complementary sequences divided by a ratio, when the ratio between the second sampling rate and the first sampling rate is a power of two.

3. The method of claim 2, wherein the cross-correlation is performed by the Golay correlator that includes:
   a first number of delay blocks respective of a last first number of delay values of the received complementary sequences, each of the delay blocks waits until a number of samples equals to a respective delay value divided by the ratio are obtained;
   a first number of multipliers for applying a last first number of weight values of the received complementary sequences;
   a first number of adders; and
   a first number of subtractors, wherein the first number equals to log2(N) minus the ratio between the second sampling rate and the first sampling rate.

4. The method of claim 1, wherein producing the special complementary sequences includes:
   producing even complementary sequences including only even samples of the received complementary sequences; and
   producing odd complementary sequences including only odd samples of the received complementary sequences, wherein the even complementary sequences and odd complementary sequences are produced when a ratio between the second sampling rate and the first sampling rate is 3/2.

5. The method of claim 4, wherein the cross-correlation is performed by the Golay correlator that includes:
   a first correlator for cross-correlating the even complementary sequences; and
   a second correlator for cross-correlating the odd complementary sequences.

6. The method of claim 5, wherein the first correlator includes:
   a K-1 delay blocks respective of last K-1 delay values of the received complementary sequences, each of the delay blocks waits until a number of samples equals to half of a respective delay value are obtained;
   a K-1 multipliers for applying last K-1 of weight values of the received complementary sequences;
   an even multiplier connected to a first delay block of the K-1 delay blocks for multiplying the input signal by a Weven value;
   a K-1 adders; and
   a K-1 subtractors, wherein K equals to a log2 value of a length of one of the received complementary sequences.

7. The method of claim 5, where the second correlator includes:
   a K-1 delay blocks respective of last K-1 delay values of the received complementary sequences, each of the delay blocks waits until a number of samples equals to half of a respective delay value are obtained;
   a K-1 multipliers for applying last K-1 of weight values of the received complementary sequences;
   an odd multiplier that multiplies the input and provides the multiplication results first delay block of the K-1 delay blocks, wherein the input is multiplied by a first weight value of the received complementary sequences;
   a K-1 number of adders; and
   a K-1 subtractors.

8. The method of claim 6, wherein a value of the Weven equals to −1.

9. The method of claim 1, wherein the receiver and transmitter of the millimeter wave wireless communication system communicate using an IEEE 802.11ad protocol.

10. A non-transitory computer-readable medium having stored thereon computer executable code that when executed by a processor performs the method of claim 1.

11. An apparatus operable in a receiver of a millimeter wave wireless communication system and configured to perform channel estimation, comprising:
   a radio frequency circuitry for receiving millimeter wave signals including Golay complementary sequences, wherein the received complementary sequences are generated at a first sampling rate;
   a processor for producing special Golay complementary sequences from the received complementary sequences; and
   a Golay correlator for cross-correlating special Golay complementary sequences with an input signal related to the received Golay complementary sequences, wherein the cross-correlation is performed at a second sampling rate and the second sampling rate is higher than the first sampling rate, and wherein the Golay correlator includes log2(N) operations where N is a length of one of the special Golay complementary sequences.

12. The apparatus of claim 11, wherein the Golay correlator includes:
   a first number of delay blocks respective of a last first number of delay values of the received complementary sequences, wherein each of the delay blocks waits until a number of samples equals to respective delay value divided by a ratio between the second sampling rate and the first sampling rate are obtained;
   a first number of multipliers for applying a last first number of weight values of the received complementary sequences;
   a first number of adders; and
   a first number of subtractors, wherein the first number equals to log2(N) minus the ratio.

13. The apparatus of claim 11, wherein the processor is further configured to produce even complementary sequences including only even samples of the received complementary sequences and odd complementary sequences including only odd samples of the received complementary sequences, wherein the even complementary sequences and the odd complementary sequences are produced when a ratio between the second sampling rate and the first sampling rate is 3/2.

14. The apparatus of claim 13, wherein the Golay correlator comprises:
   a first correlator for cross-correlating the even complementary sequences with an input signal; and
   a second correlator for cross-correlating the odd complementary sequences with an input signal.

15. The apparatus of claim 14, wherein the first correlator includes:
   a K-1 delay blocks respective of last K-1 delay values of the received complementary sequences, wherein each of the delay blocks waits until a number of samples equals to half of a respective delay value are obtained;
   a K-1 multipliers for applying last K-1 of weight values of the received complementary sequences;
   an even multiplier connected to a first delay block of the K-1 delay blocks for multiplying an input sample value with a Weven value;
   a K-1 number of adders; and
   a K-1 subtractors, wherein K equals to a log2 value of a length of the received complementary sequences.

16. The apparatus of claim 14, wherein the second correlator includes:
   a K-1 delay blocks respective of last K-1 delay values of the received complementary sequences, wherein each of the delay blocks waits until a number of samples equals to half of a respective delay value are obtained;
   a K-1 multipliers for applying last K-1 of weight values of the received complementary sequences;
   an odd multiplier that multiplies the input and provides the multiplication results first delay block of the K-1 delay blocks, wherein the input is multiplied by a first weight value of the received complementary sequences;
   a K-1 number of adders; and
   a K-1 subtractors, wherein K equals to a $\log_2$ value of a length of the received complementary sequences.

17. The apparatus of claim 11, wherein the receiver communicates with a transmitter of the millimeter wave wireless communication system using an IEEE 802.11ad protocol.

* * * * *